April 8, 1969
L. J. CHAMBON
3,436,791
MACHINE FOR THE CONTINUOUS MOULDING OF A PULVERULENT OR
CRYSTALLINE PRODUCT IN THE
FORM OF SEPARATE LUMPS
Filed May 2, 1966
Sheet 3 of 5
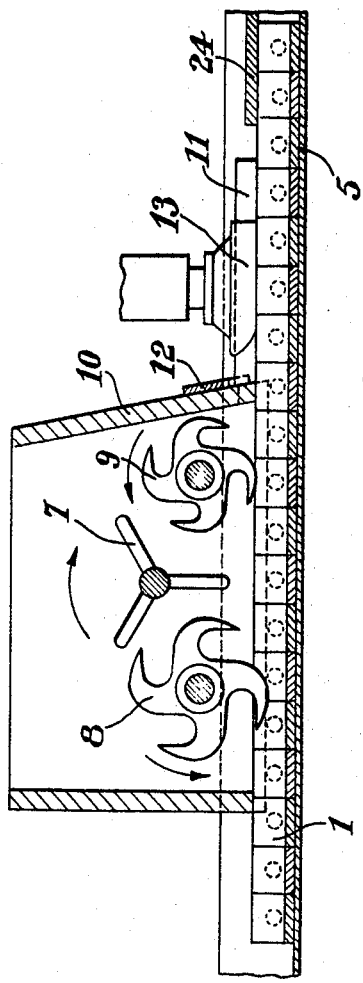
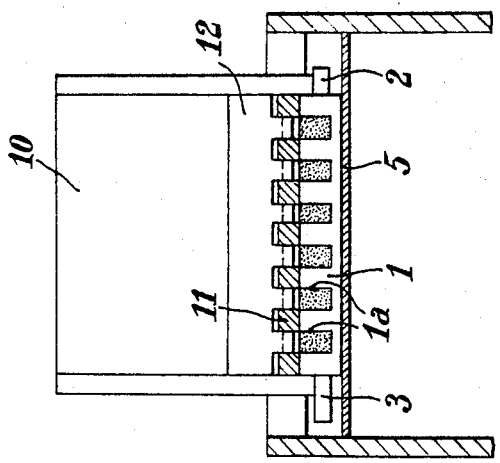

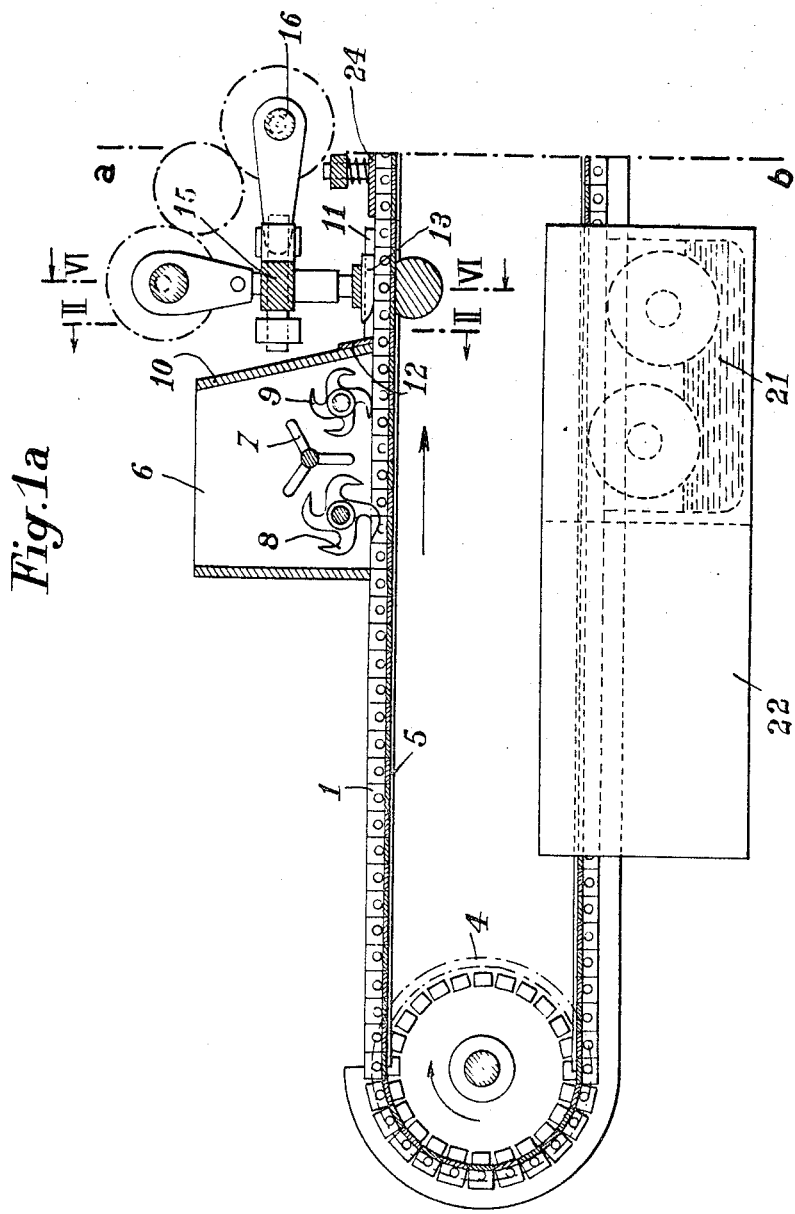

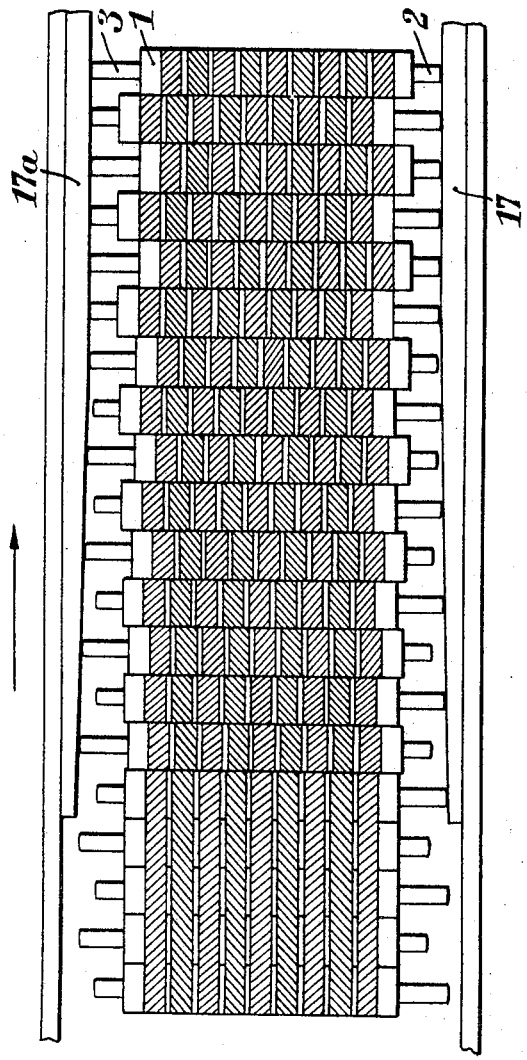
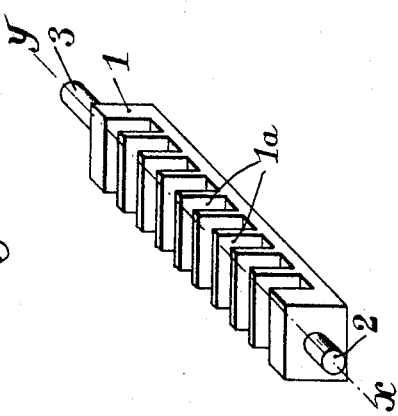

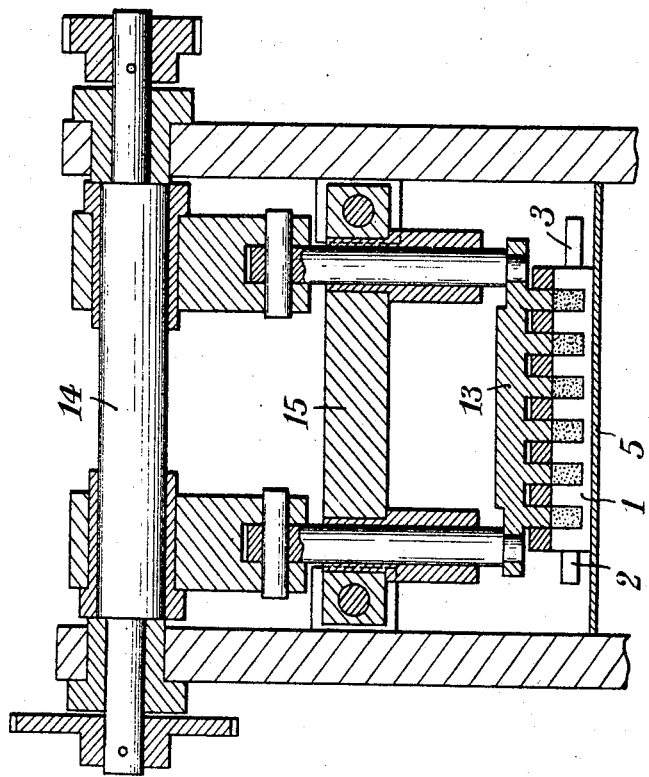

United States Patent Office 3,436,791
Patented Apr. 8, 1969

3,436,791
MACHINE FOR THE CONTINUOUS MOULDING OF A PULVERULENT OR CRYSTALLINE PRODUCT IN THE FORM OF SEPARATE LUMPS
Louis Jean Chambon, Paris, France, assignor to Societe d'Etudes de Machines Speciales, Societe Anonyme, Paris, France, a French company
Filed May 2, 1966, Ser. No. 547,053
Claims priority, application France, May 6, 1965, 16,033
Int. Cl. B28b 3/02
U.S. Cl. 18—4
4 Claims

ABSTRACT OF THE DISCLOSURE

A machine for continuously moulding a pulverulent or crystalline product in the form of separate lumps, the product being agglomerated with the assistance of a binder under pressure. This machine comprises a series of seprate transverse moulds juxtaposed longitudinally and formed each with at least one groove having a cross sectional contour corresponding to that of the desired lumps, the grooves of the various separate juxtaposed moulds thus bounding at least one continuous longitudinal channel. In a filling and ramming station the product is rammed in said groove or grooves of said separate moulds and means disposed at the downstream end of said ramming station control the gradual and relative transverse displacement of the separate moulds with respect to one another, so as to separate lumps of a predetermined length in each strip of said product.

---

This invention is concerned with a machine for continuously moulding a pulverulent or crystalline product in the form of separate lumps, the product being agglomerated with the assistance of a binder under pressure, the machine being characterized in that it comprises a series of transverse separate moulds juxtaposed in the longitudinal direction and formed with at least one groove having a cross sectional contour corresponding to that of the desired lumps, the grooves of the various separate juxtaposed moulds thus bounding at least one continuous longitudinal channel, a device for displacing in the longitudinal direction all the separate abutting molds through a filling and ramming station in which the product is rammed in the groove or grooves of the various separate moulds, in order to form at least one continuous strip of agglomerated product, and that a device controlling the gradual and relative transverse displacement of the separate moulds with respect to one another is provided at the downstream end of said ramming station, for detaching lumps of a predetermined length from each strip of said product.

The lump or lumps contained in each separate mould are subsequently stripped from the mould and discharged upon an endless conveyor belt for performing possible subsequent treatments.

The machine according to this invention permits of eliminating any lubrication problem and the product thus obtained remains absolutely pure and free of any foreign substance.

A typical form of embodiment of the present invention will now be described by way of example with reference to the diagrammatic drawing attached hereto. In the drawing:

FIGURES 1a and 1b are diagrammatic vertical sections showing a continuous moulding machine according to this invention, these figures being adapted to be assembled end to end along the lines a–b;

FIGURE 2 is a cross section taken on a larger scale along the line II—II of FIGURE 1;

FIGURE 3 is a fragmentary longitudinal section showing on a larger scale the filling and ramming station;

FIGURE 4 is a diagrammatic plane view showing the machine section in which the various separate moulds are shifted transversely to one another;

FIGURE 5 is a perspective view of a separate mould, and

FIGURE 6 is a cross section taken upon the line VI—VI of FIGURE 1.

Figure 1B:
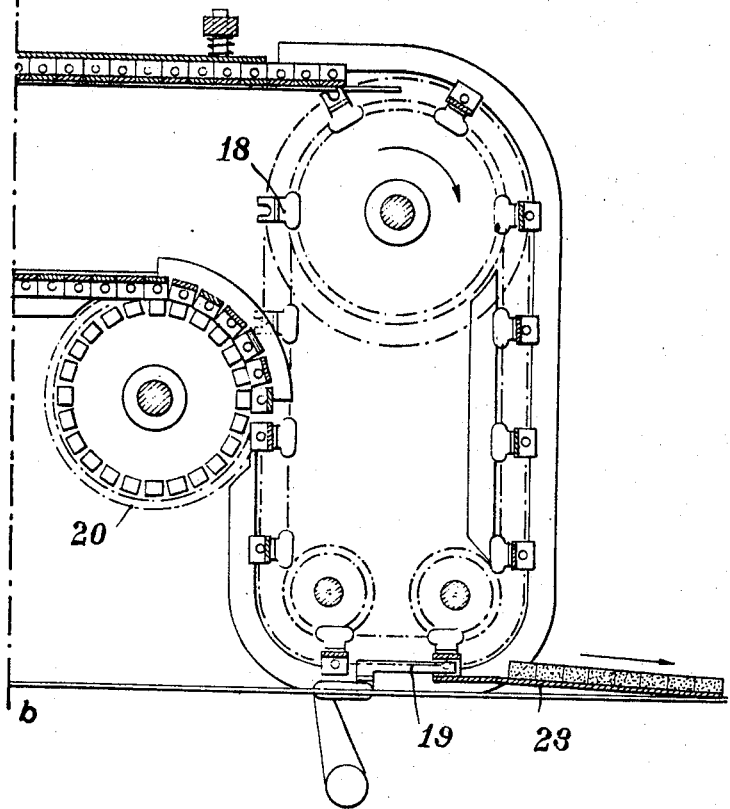

The machine of which the operation will now be described comprises essentially a series of abutting moulds travelling along a table and forming during the filling step a continuous assembly, the grooves of each mould being aligned with one another.

The mould assembly travels continuously in the circuit section corresponding to the filling and ramming steps, and intermittently in the section registering with the stripping device.

The moulds of which a typical form of embodiment is illustrated in FIGURE 5 consist each of a parallelepipedal body formed with a number of grooves 1a directed at right angles to the mold axis x–y (FIGURE 5). The number of grooves 1a varies as a function of the transverse dimension of the machine.

Each mould comprises at either end trunnions 2 and 3 for transporting the moulds and sectioning the product.

As will be explained presently, the trunnion 2 is shorter than trunnion 3 for permitting the sectioning operation.

The abutting moulds comprise alternatively on the same side a short trunnion 2 and a long trunnion 3 as shown in FIGURE 4.

The moulds are actuated by a driving wheel 4 of the sprocket type engaging their trunnions 2 and 3 so as to successively feed the moulds to a plate 5 towards a hopper 6 containing the composition of the product to be agglomerated.

In the specific but exemplary form of embodiment illustrated, this hopper 6 is equipped with a row of fixed rotary spider wheels 7 and two rows of vertically adjustable rotary spider wheels 8, 9, these spider wheels being adapted to stir the product and properly distribute same in the mould grooves.

The fact that spider wheels 8 and 9 are vertically adjustable permits of performing a preliminary ramming of the product in the continuous channel formed by the mould grooves, this preliminary ramming operation being facilitated, as a rule, on the other hand, by the specific configuration of spider wheels 9.

A plate 10 disposed on the outlet side of the hopper has a plurality of rectangular apertures formed along its lower edge and engaged by guide strips 11 providing on either side of the mould grooves flush vertical walls whereby the product can travel at a level higher than the top plane of the moulds 1 before being subjected to the ramming operation.

This level is adjusted at the proper height by means of a lock-gate 12 whereby the product can be metered with a view to vary at will the weight of the separate lumps as a function of the vertical dimension of the stream of product thus obtained.

The thus metered mixture is subsequently compressed by ramming. A ramming head 13 strikes the product at a fast rate as the moulds travel thereunder. This head is reciprocated in a vertical plane by an eccentric 14 and supported by a cross member 15 to which a lateral reciprocating motion is applied by another eccentric 16. The average speed of this lateral swinging motion during the actual ramming period may be equal to the mould feed rate if it is desired to avoid and glazing or smoothing of the product surface during the compression step.

The bottom dead center of rammer 13 is a coincident with the top plane of the moulds so that at the end of the ramming step the compresesed product is flush with this top plane.

The endless strips being thus formed and compressed, the moulds 1 subsequently travel beneath a plate 24 pressed by spring means against the upper face of the moulds, and then between a pair of lateral guide strips or ramps 17 and 17a adapted to shift them laterally with respect to one another.

This lateral shifting movement is permitted by the provision of the aforesaid asymmetric trunnions 2 and 3 carried by the moulds, as clearly shown in FIGURE 4.

The continuous strip of compressed product is thus sectioned into lumps having the desired length, the shearing movement taking place in a gradual and effortless manner to produce a clean cut.

The function of the aforesaid spring-urged plate 24 is to enclose completely the strip of product during the shearing thereof by the lateral shifting strips 17 and 17a.

After this sectioning step the moulds are restored to their aligned position by a block system (not shown) so that the lumps be realigned prior to the subsequent stripping operation.

At the right-hand end of plate 5 the moulds are carried along by another chain 18 driven with an intermittent motion to provide a gap between the adjacent moulds with a view to strip the lumps with the assistance of a push member 19 (see FIGURE, 1b).

The freshly stripped lumps are discharged by means of a moderately inclined plane 23 onto another conveyor belt and directed towards subsequent treatments or operations.

The empty moulds are then raised by the chain 18 and taken by another sprocket 20 which returns them to the continuous initial circuit as described hereinabove.

The moulds thus pushed in abutting relationship by the wheel subsequently travel through a washing tunnel 21 equipped if desired with shower and brushing means, and then through a wiping and drying tunnel 22, whereafter they are taken again by the wheel 4 to resume a fresh moulding cycle.

Of course, the forms of embodiment described hereinabove are given by way of example only and should not be construed as limiting the invention since many modifications and variations may be brought thereto without departing from the spirit and scope of the invention as set forth in the appended claims.

What I claim is:

1. A machine for continuously moulding a pulverulent or crystalline product in the form of separate lumps, the product being agglomerated with the assistance of a binder under pressure, this machine comprising a series of separate transverse moulds juxtaposed longitudinally and formed each with at least one groove having a cross-sectional contour corresponding to that of the desired lumps, the grooves of the various separate juxtaposed moulds thus bounding at least one continuous longitudinal channel, a filling and ramming station whereat the product is rammed in said groove or grooves of said separate moulds, means for displacing all the abutting separate moulds in the longitudinal direction through said filling and ramming station so as to form at least one continuous strip of agglomerated product, and other means disposed at the downstream end of said ramming station for controlling the gradual and relative transverse displacement of the separate moulds with respect to one another, so as to separate lumps of a predetermined length in each strip of said product.

2. A machine as set forth in claim 1, wherein said separate moulds have a parallelepipedal configuration.

3. A machine as set forth in claim 1, wherein each mould is provided at its opposite ends with two trunnion extensions for driving said moulds.

4. A machine as set forth in claim 3, wherein the two trunnion extensions of each mould have unequal lengths and said abutting moulds are so disposed that on a same mould side the short and long trunnions of the various moulds alternate with each other, and means for causing the transverse relative displacement of said moulds, said last-named means comprising two lateral guide strips adapted to be engaged by the trunnions of the various moulds.

References Cited

UNITED STATES PATENTS

| | | | |
|---|---|---|---|
| 2,288,611 | 7/1942 | De Wyk | 18—6 |
| 2,483,638 | 10/1949 | Howe | 28—99 |
| 2,553,481 | 5/1951 | Sharples | 25—99 |
| 3,005,420 | 10/1961 | Wiklund et al. | 25—99 X |
| 3,076,999 | 2/1963 | Washburn | 18—1 |
| 3,140,511 | 7/1964 | Seufert et al. | 18—1 |

WILLIAM J. STEPHENSON, Primary Examiner.

U.S. Cl. X.R.

25—99